Oct. 17, 1950  H. J. GREGG  2,526,606
PROTECTIVE COVER FOR ELECTRICAL OUTLETS
Filed Aug. 30, 1947

Inventor
Hendrick J. Gregg
By: Spencer, Marzall, Johnston & Cook
Attys

Patented Oct. 17, 1950

2,526,606

UNITED STATES PATENT OFFICE 2,526,606

PROTECTIVE COVER FOR ELECTRICAL OUTLETS

Hendrick J. Gregg, Arlington Heights, Ill.

Application August 30, 1947, Serial No. 771,405

1 Claim. (Cl. 174—67)

The invention relates to a protective device for electrical outlets, such as domestic wall outlets.

The ordinary wall socket or electrical outlet is a constant source of danger when small children are present in the home in that their inquisitive nature impels them to place their fingers in the openings provided for electric plugs, and to place small articles, such as screwdrivers, hairpins and the like, therein. The small fingers of children and infants and such articles placed in the outlet may reach the electrical conductors within the outlet and result in serious injury to the child.

While this is the main source of danger from ordinary domestic electrical outlets, they also result in inconvenience at times when plugs are located therein. The plugs necessarily protrude and may become disconnected by being knocked from the socket, thereupon leaving the outlet again free for the insertion of the small metallic objects by infants. Even when the electrical outlets have the plugs inserted therein, it is always possible for a small child to remove the plug leaving the outlet open to the dangers above mentioned.

It is, therefore, a principal object of the present invention to provide a protective covering for electrical outlets which will obviate the dangers mentioned hereinabove.

Another object of the invention is to provide a protective covering for electrical outlets which includes a base plate adapted to be secured to the wall over the ordinary wall socket plate, or as a substitute therefor, and a hood adapted to be releasably mounted on the base plate for the purpose of covering the electrical outlets and any plugs which may be positioned therein.

A further object of the invention is to provide a protecting cover for electrical outlets which includes a base portion and a hood, wherein cooperating interlocking and releasable means are located on the base plate and the edge of the hood, whereby the hood may be easily placed over the base plate and secured in place thereon, or may be removed therefrom merely by flexing one side of the hood.

Still another and more specific object of the invention is to provide a protective cover for electrical outlets which includes a base plate and a hood releasably mounted thereon, which hood is provided with a plurality of recesses extending inwardly from its edge portion to permit passage therethrough of the electrical conductor attached to the plugs located in the outlet.

Other objects and advantages of the invention will become apparent upon reading the following description taken in conjunction with the accompanying drawing in which.

Figure 1:
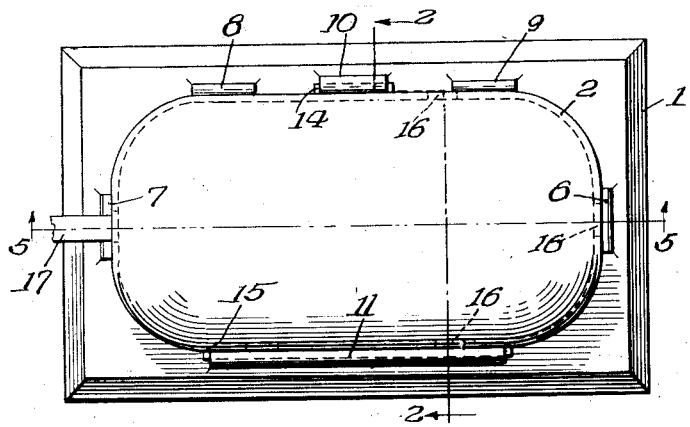
Fig. 1 is a plan view of the assembled base plate and hood.
Figure 2:
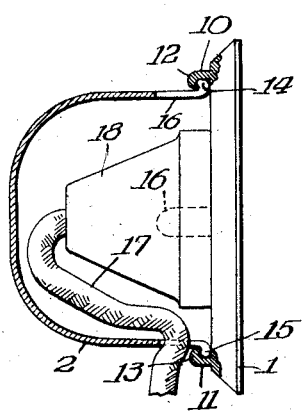
Fig. 2 is a vertical transverse sectional view taken substantially along the plane of line 2—2 of Fig. 1.
Figure 3:
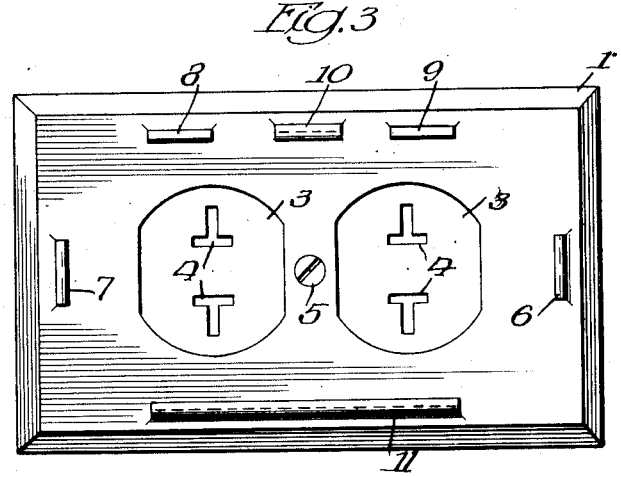
Fig. 3 is a plan view of the base plate.

The invention as disclosed herein comprises generally a base plate to which a covering hood may be releasably or detachably secured. The base plate has openings therein adapted to receive an electrical plug, and the hood is adapted to cover the electrical outlets. The device is useful whether or not a plug is in place in the outlet, and is designed to cover such a plug and permit the electrical conductor attached thereto to pass outwardly and be connected to a light or other electrical appliance.

Referring now more particularly to the drawing, the base plate is indicated by the numeral 1 and the hood which is secured thereto is indicated by the numeral 2. The base plate 1 is provided with a plurality of openings 3, corresponding to the number of electrical outlets to be covered. The outlets indicated at 4 will still be accessible for the purpose of inserting an electrical plug. The base plate 1 may be secured in any suitable manner to the wall by means such as the screw 5 and may be adapted to either replace the ordinary outlet plate, or to cover such plate.

The base plate 1 has outwardly extending ears 6 and 7 adjacent each end thereof and has other similar outwardly extending ears 8 and 9 along one side thereof. A retaining ear 10 is preferably located between the two ears 8 and 9 at one side of the base plate 1 and an elongated retaining ear or extension 11 is located at the opposite side of the base plate 1. The plain ears 6, 7, 8 and 9 are utilized primarily to prevent displacement of the hood in its attached position, while the special retaining ears 10 and 11 are designed for cooperating with the edge of the hood 2 to releasably or detachably secure the hood in place.

The ear 10 is provided with an inwardly turned upper edge to form a hook portion 12 while the special elongated ear 11 has a similar inwardly turned outer edge to provide a hook portion 13.

It will be evident that the two ears 8 and 9 may also be provided with such hook portions if it is desired, but it has been found that the hook portion 12 on the intermediate ear 10 is sufficient to maintain the hook in place for all practical purposes. Likewise, similar plain ears may be located adjacent the elongated ear 11 if so desired, but this has been found to be unnecessary in actual practice. The plain ears 6 and 7 at each end of the base plate 1 operate to prevent any longitudinal sliding movement of the hood 2 while secured to the base plate 1.

One longitudinal edge of the hood 2 has an outwardly extending bead or lip 14 which provides a hook portion adapted to be placed beneath the hook portion 12 of the ear 10, whereupon the two hook portions 12 and 14 cooperate to retain the hood against removal. The opposite longitudinal edge of the hood 2 is also provided with an elongated outwardly turned lip or bead 15 which is adapted to cooperate with the hook 13 on the ear 11 to also retain hood 2 against removal.

Figure 4:
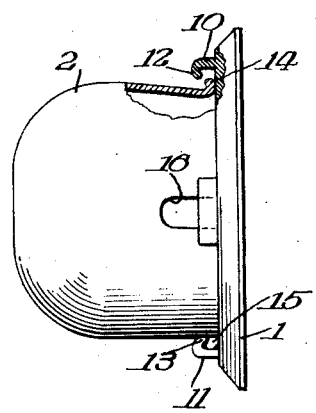
Fig. 4 is an end elevational view of the assembled base plate and hood with a portion thereof broken away and shown in section.
Figure 5:
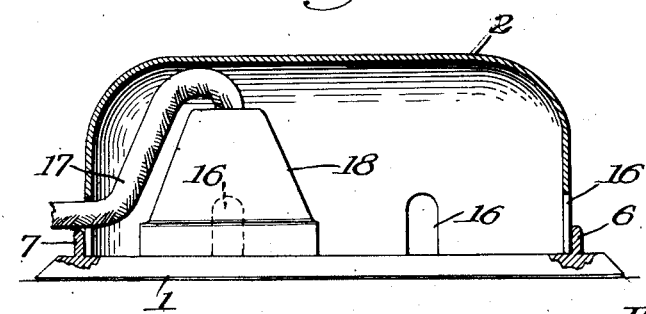
Fig. 5 is a horizontal longitudinal sectional view taken substantially along the plane of line 5—5 of Fig. 1.

One or both longitudinal edges of the hood 2 are so formed as to be able to be flexed inwardly either when the hood 2 is being placed on the base plate 1, or when it is being removed therefrom. One side of the hood 2 is illustrated in its flexed position in Fig. 4, whereupon it will be evident that in this position the hood 2 may be easily removed by pivoting about the hook portions 13 and 15 until the hook portion 15 is free from the hook portion 13.

The two ends of the hood 2 are preferably plain so that they may abut directly against the inner faces of the two ears 6 and 7, whereupon any longitudinal sliding movement of the hood is prevented.

A plurality of recesses 16 are located in spaced relation about the edge of the hood 2 and extend inwardly from such edge a sufficient distance to permit passage therethrough of an electrical conductor 17 attached to an electrical plug 18. Thus it will be clear that the hood 2 may be utilized to merely cover the open outlets 4 and may also be utilized to cover an electric plug which may be located in the outlet. When a plug 18 is in place in an outlet, its conductor 17 may pass freely through one of the recesses 16 in the hood 2, whereupon it may be connected to a light or suitable appliance for use.

The curved outer edges of the ears 10 and 11 will permit easy placement of the hood into locking engagement against the base plate 1. One of the lips or hook portions 14 or 15 may be inserted between the corresponding hook portion on the adjacent ear and then placed against the base plate, whereupon the curved upper edge of the opposite ear will co-act with the curved lip on the edge of the hood to flex this edge of the hood inwardly. When the edge of the hood has reached the base plate, the edge which has been flexed inwardly will then spring outwardly, whereupon both lips 14 and 15 will cooperate with the hook portions 12 and 13 to releasably retain the hood in place. For removal of the hood it is merely necessary to press one edge thereof to flex the side of the hood inwardly to clear the interlocking hook portions, whereupon the hood may be lifted bodily from the base plate.

The protective device disclosed herein has been found, in actual practice, to effectively protect electrical outlets from tampering by children and infants and is an effective safe-guard against the dangers inherent when such outlets are left open. The hood is made of sufficiently strong material so that the pressure required to release it cannot be exerted by the average small child.

Another feature of the invention resides in placing the openings in the hood for the passage of the electric cord around the edge of the hood, in such a position that small articles, such as screwdrivers, hairpins and the like, inserted through said openings, will be substantially parallel to the face of the outlet, and therefore cannot reach the outlet.

Changes may be made in the form, construction and arrangemet of parts from that disclosed herein without in any way departing from the spirit of the invention or sacrificing any of the attendant advantages thereof, provided, however, that such changes fall within the scope of the claim appended hereto.

The invention is hereby claimed as follows:

A protective device for electrical outlets normally located in household baseboards comprising a base plate having an outlet opening therein to receive an electric outlet, a hood formed of a resilient material located over said base plate with the part opposite said outlet opening spaced therefrom a sufficient distance to cover an electric plug in said outlet, cooperating interlocking means on said base plate and the edge of said hood to retain said hood on said base plate and to prevent transverse movement thereof, and means at the ends of said base plate to prevent longitudinal movement of said hood in either direction, said edge of the hood being adapted to be flexed inwardly to thereby release the interlocking means and permit removal of said hood, the flexibility of said hood being insufficient to be flexed by a small child thereby to prevent the child from removing said hood and inserting a finger or metal object in the outlet and obtaining a shock, and said hood having an opening therein for an electrical cord connected to said electric plug.

HENDRICK J. GREGG.

REFERENCES CITED

The following references are of record in the file of this patent:

UNITED STATES PATENTS

| Number | Name | Date |
|---|---|---|
| 646,222 | Keil | Mar. 27, 1900 |
| 829,909 | Craft | Aug. 28, 1906 |
| 2,211,818 | Innis | Aug. 20, 1940 |
| 2,415,602 | Monaco | Feb. 11, 1947 |

FOREIGN PATENTS

| Number | Country | Date |
|---|---|---|
| 67,306 | Norway | Jan. 17, 1944 |